(12) United States Patent
Gilbert

(10) Patent No.: US 10,517,270 B2
(45) Date of Patent: Dec. 31, 2019

(54) DOG COAT WITH CONCEALABLE OUTER LAYER

(71) Applicant: Connie Jo Gilbert, Portland, OR (US)

(72) Inventor: Connie Jo Gilbert, Portland, OR (US)

(*) Notice: Subject to any disclaimer, the term of this patent is extended or adjusted under 35 U.S.C. 154(b) by 176 days.

(21) Appl. No.: 15/937,301

(22) Filed: Mar. 27, 2018

(65) Prior Publication Data

US 2019/0297845 A1    Oct. 3, 2019

(51) Int. Cl.
*A01K 13/00* (2006.01)
*A01K 27/00* (2006.01)

(52) U.S. Cl.
CPC .......... *A01K 13/006* (2013.01); *A01K 13/008* (2013.01); *A01K 27/008* (2013.01)

(58) Field of Classification Search
CPC .. A01K 13/006; A01K 13/008; A01K 27/008; A01K 13/00; A01K 27/00; A41D 15/04; A41D 15/00; A41D 2400/424
See application file for complete search history.

(56) References Cited

U.S. PATENT DOCUMENTS

| | | | |
|---|---|---|---|
| 4,103,361 A * | 8/1978 | Carmen | A41D 3/00 2/97 |
| 5,077,838 A * | 1/1992 | Senser | A41D 15/00 2/102 |
| 5,384,915 A * | 1/1995 | Rodriguez | A41D 1/02 2/108 |
| D383,255 S * | 9/1997 | Caditz | D30/145 |
| 5,732,415 A | 3/1998 | Boyd | |
| 5,970,921 A * | 10/1999 | Fulton | A01K 13/006 119/858 |
| 6,138,611 A | 10/2000 | Thielemann | |
| 9,374,983 B1 | 6/2016 | Kuehr | |
| D802,854 S | 11/2017 | Caruso | |
| 9,826,718 B2 * | 11/2017 | Dewey | A01K 27/008 |
| 10,258,135 B2 * | 4/2019 | Leek | A45F 4/12 |
| 2008/0223310 A1 | 9/2008 | Remick | |
| 2010/0277945 A1 | 11/2010 | Hurwitz | |
| 2013/0276719 A1 | 10/2013 | Ferrando | |
| 2015/0047577 A1 | 2/2015 | Schnieder | |
| 2017/0013804 A1 * | 1/2017 | Fachner, Sr. | A01K 13/006 |

FOREIGN PATENT DOCUMENTS

| | | | |
|---|---|---|---|
| AU | 1442216 | 11/2000 | |
| DE | 10114631 A1 * | 10/2002 | .......... A01K 13/006 |
| GB | 2388514 | 9/2005 | |
| JP | 1136641 | 3/2002 | |

* cited by examiner

*Primary Examiner* — Kristen C Hayes
(74) *Attorney, Agent, or Firm* — Schaffer IP Law, LLC

(57) ABSTRACT

A garment for a four legged animal comprises a first expanse configured to substantially cover the trunk of an animal. A first set of wings are coupled to a proximal end of the first expanse and configured to secure together about the neck of the animal. A second set of wings are coupled to the first expanse distally to the first set and configured to secure together about the trunk of the animal. A collar extending forwardly from the proximal end of the first expanse is configured to be folded back to create a gap with the first expanse. The second expanse is configured to attach to and substantially cover the first expanse in a first, unfurled position and to roll up adjacent the proximal end of the first expanse in a second, stowed position within the gap formed between the collar and the first expanse.

20 Claims, 6 Drawing Sheets

DOG COAT WITH CONCEALABLE OUTER LAYER

BACKGROUND OF THE INVENTION

1. Field of the Invention

This application relates to protective garments for dogs or other animals, and in particular to a dual-layered animal coat where the outer layer may be selectively retracted and hidden from view without being detached.

2. Description of the Prior Art

Coats or other garments for small animals, dogs, or pets may serve a number of different functions: such as providing warmth, providing protection from rain and snow, and providing a fashionable appearance for the pet. Animal garments may employ a variety of fabrics or materials dependent upon the specific functionality provided by the animal coat.

At times, an animal or pet owner may seek to customize an animal's coat to provide warmth and/or rain and snow protection in response to specific weather conditions. Additionally, the pet owner may seek to customize a pet's coat for a specific outing where the pet will be taken. An example of such a pet coat is described in U.S. patent application Ser. No. 13/868,177 (Ferrando), which includes an thick inner material layer for warmth and a detachable outer membrane to provide waterproofing. The outer membrane may be removed from the inner layer via snaps and then retained in the owner's pocket or bag. However, this gets to be inconvenient and/or uncomfortable for the pet owner, particularly if the membrane is wet from rain. Furthermore, the owner must remember to bring the second layer with them during a walk in case of rain.

The present invention addresses these issues by providing an animal coat where the waterproof outer layer remains at least partially attached to the lower layer and hidden from view until needed.

SUMMARY OF THE INVENTION

The invention comprises a garment for a four legged animal, comprising a first insulative expanse configured to substantially cover the trunk of an animal and a second waterproof expanse configured to attach to and substantially cover said first expanse. The second expanse is releasably attachable along at least a periphery of the first expanse so that it can, in a first position, be unfurled and lay flat against the first expanse to thereby provide a waterproof layer and, in a second position, be rolled up to a position adjacent a proximal end of the first expanse adjacent the neck of the animal when the waterproof layer is no longer needed. A collar extends forwardly from the proximal end of the first expanse and is configured to be folded back to create a gap with the first expanse in which at least a portion of the second expanse is disposed. A plurality of separable fasteners are configured to attach the second expanse to the first expanse, wherein at least a proximal one of the plurality of fasteners attaching the second expanse to the first expanse is disposed within the gap created between the collar and the first expanse. The second expanse is configured to be detached from all but the proximal one of the plurality of fasteners and rolled up adjacent the proximal end of the first expanse so that an entirety of the second expanse is retained within the gap created between the collar and the first expanse in the second stowed position of the second expanse.

In another aspect of the invention, the garment for a four legged animal comprises a first expanse configured to substantially cover the trunk of an animal, with the first expanse having a proximal end adjacent the neck of the animal. A first set of wings are coupled to the proximal end of the first expanse and configured to secure together about the neck of the animal. A second set of wings are coupled to the first expanse, distally of the first set, and configured to secure together about the trunk of the animal. A collar extending forwardly from the proximal end of the first expanse is configured to be folded back to create a gap with the first expanse. The second expanse is configured to attach to and substantially cover the first expanse in a first unfurled position and to roll up adjacent the proximal end of the first expanse in a second stowed position within the gap formed between the collar and the first expanse.

In this way, the animal garment can include a two-layer design where the top waterproof layer may be stowed and hidden away on the garment itself without fully removing it so that the colorful insulative layer (e.g. fleece) can be exposed on sunny days when the waterproof layer is not needed.

The foregoing and other objects, features and advantages of the invention will become more readily apparent from the following detailed description of a preferred embodiment of the invention that proceeds with reference to the accompanying drawings.

DETAILED DESCRIPTION

Figure 1:
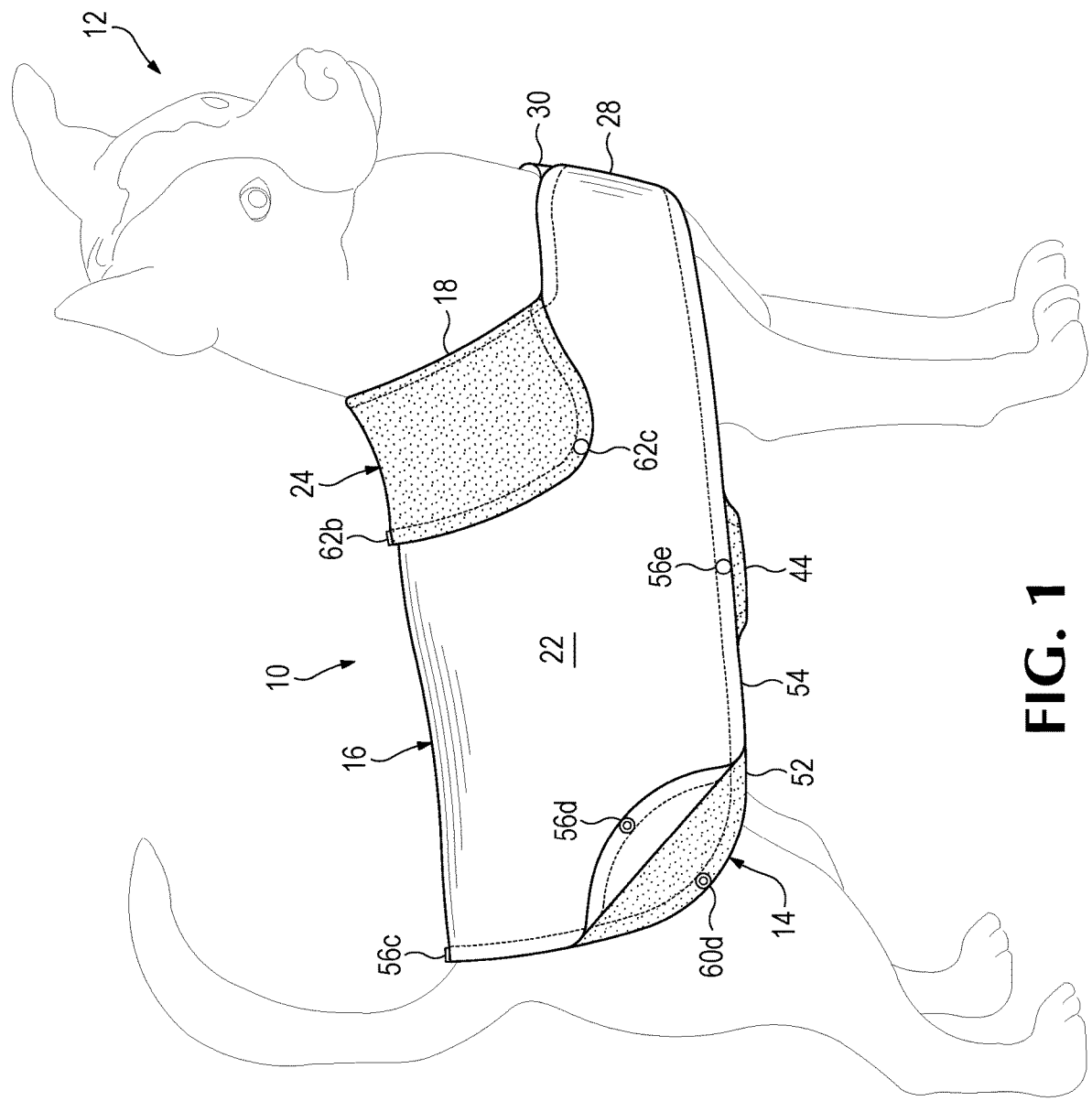
FIG. 1 is a perspective view of the animal coat of the present invention secured to an animal with an outer layer of the coat partially detached from the inner layer.

FIG. 1 illustrates a garment 10 constructed according to an embodiment of the invention as worn by a four-legged animal, here dog 12. Garment 10 comprises generally bottom and top layers 14, 16 substantially covering a torso of animal 12 that are releasably attached together as described further below and constructed in a preferred embodiment with materials having heat conserving and weatherproof properties, respectively.

More specifically, layer 14 comprises a first expanse 20 (FIG. 7) configured to substantially cover the trunk of an animal 12, with the first expanse having a proximal end 18 adjacent the neck of the animal 12. Layer 14 is preferably formed of a insulative material such as polar fleece, canvas with a nylon lining, and canvas with a woven lining intended to keep the animal warm. Other examples of materials used for layer 14 include brushed fleece, blizzard fleece, anti-pill fleece, premium fleece, velour fleece, puffer quilted fabric, quilted polyester fabric, Sherpa, sweatshirt fleece, and organic cotton sweatshirt fleece. These materials may be mixed and matched within the multi-layer or lined designs described further below, e.g. a puffer quilted coat with a Sherpa lining. The layer 14 material is preferably patterned as shown in FIGS. 2-6 in an attractive and colorful plaid design that is exposed when the waterproof top layer 16 is removed.

Figure 7:
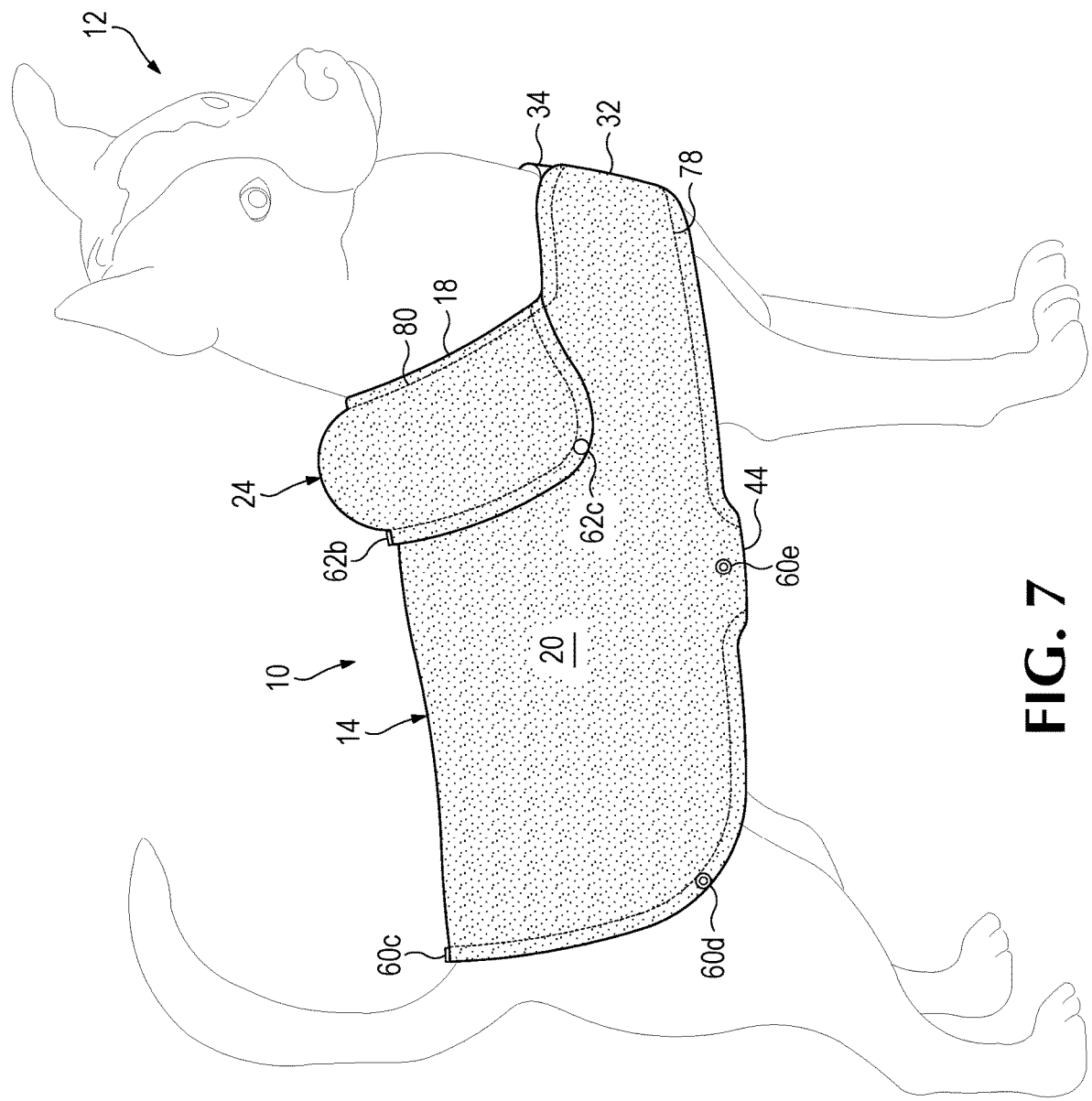
FIG. 7 is a perspective view of the animal coat of the present invention worn by an animal with an outer layer in the fully stowed and concealed position beneath the collar of the animal coat.

Layer 16 comprises a second waterproof expanse 22 configured to attach to and substantially cover said first expanse 20 in a first unfurled position as shown in FIG. 1 and to roll up adjacent the proximal end 18 of the first expanse 20 in a second stowed position as shown in FIG. 7. Layer 16 is preferably formed of a waterproof material such as textured polyurethane materials, patterned polyurethane materials, canvas and nylon, or a breathable, waterproof layer such as Gore-Tex™ and is intended to keep the animal (and lower insulative layer 14) dry during rainy weather.

Figure 2:
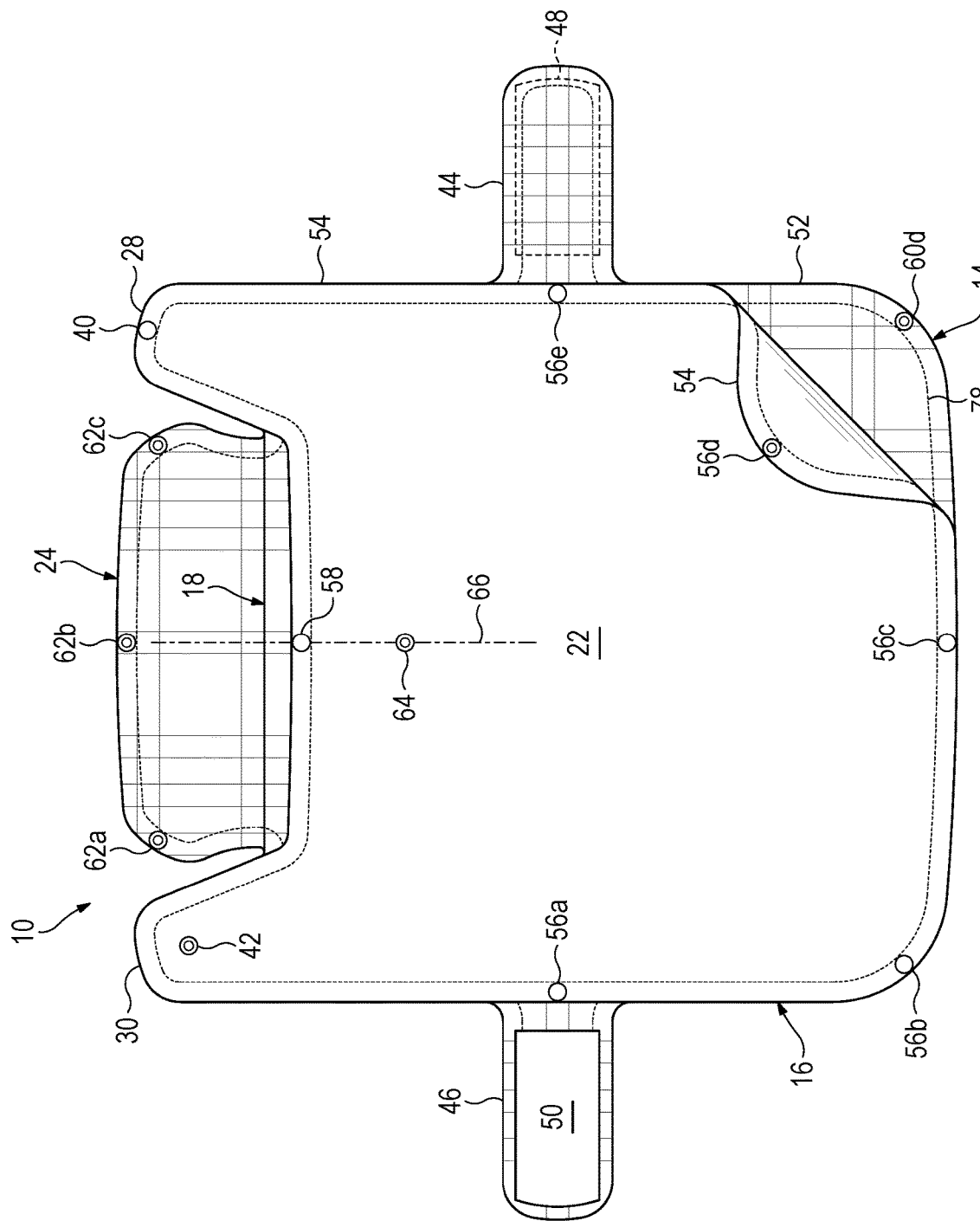
FIG. 2 is a plan view of the animal coat of the present invention removed from the animal and laid flat with the outer layer partially detached from the inner layer as in FIG. 1.
Figure 6:
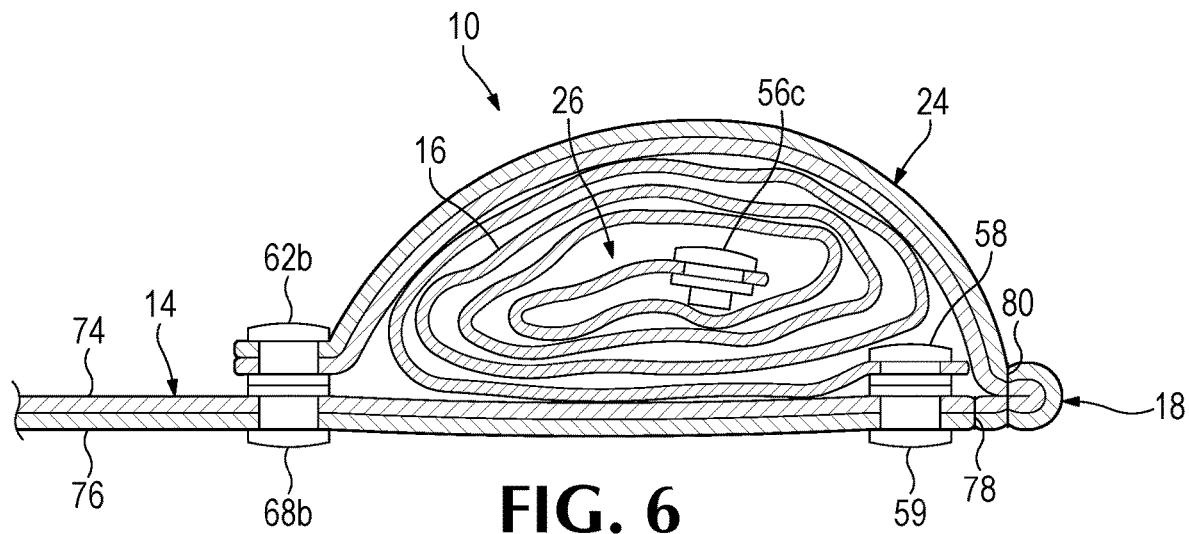
FIG. 6 is a side elevation sectional view of the animal coat taken along line 6-6 in FIG. 5 with the outer layer shown in a stowed position to conceal it from view within the gap created between the collar and the inner layer.

Layer 14 includes a collar 24 that extends forwardly from the proximal end 18 of the first expanse 20 and is configured to be folded back to create a gap 26 (FIG. 6) with the first expanse 20 in which at least a portion of the second expanse is disposed. In the unfurled position where waterproof layer 16 is fully attached to and lays flat against the insulative bottom layer 14 as shown in FIGS. 1 and 2, only the proximal portion of the waterproof expanse 22 is disposed within the gap 26 formed between the collar 24 and bottom layer 14. In the stowed position as shown in FIGS. 6 and 7, the entirety of the waterproof layer 16 may be disposed and hidden from view within gap 26.

Figure 4:
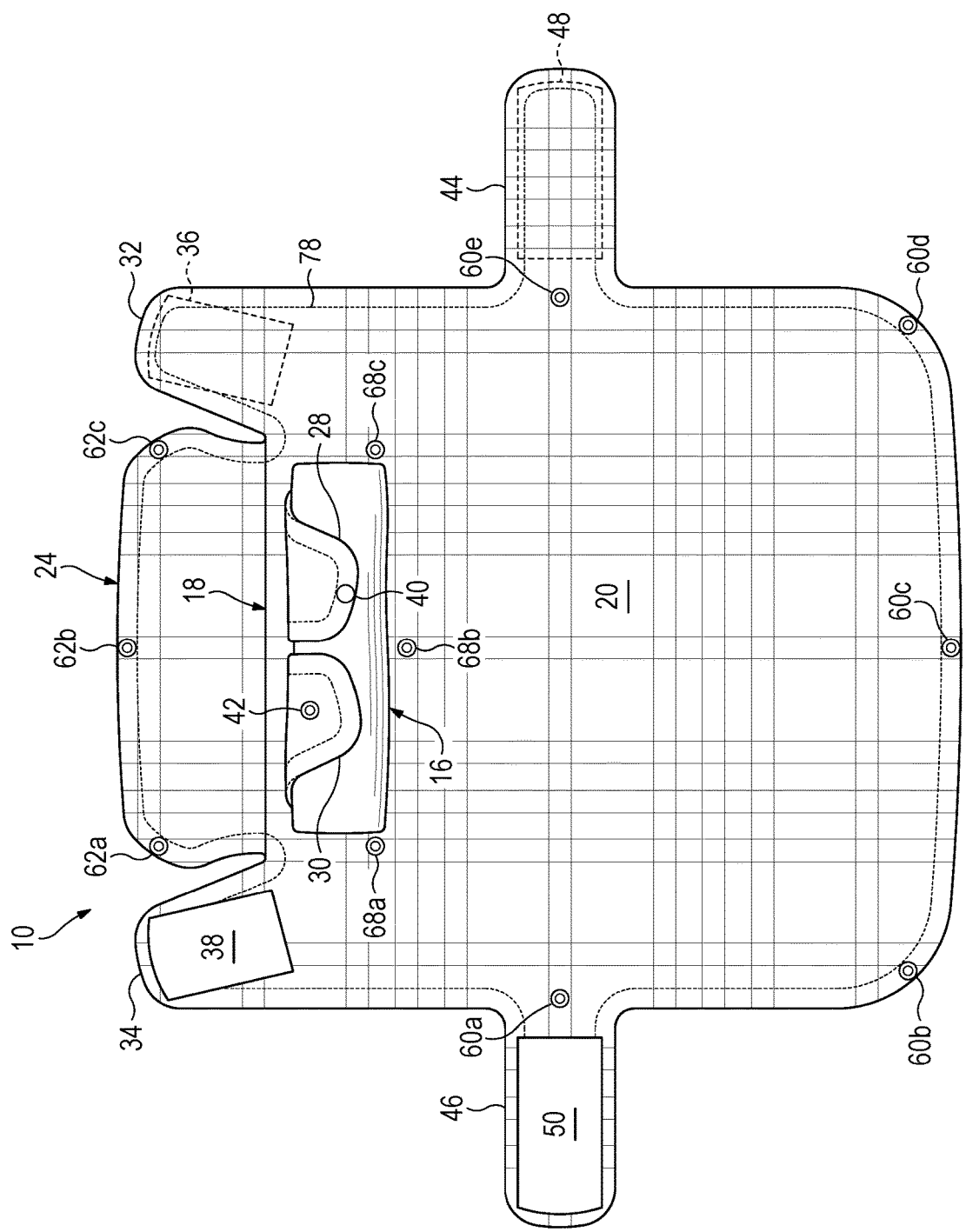
FIG. 4 is a plan view of the animal coat of FIG. 1 with the outer layer moved to a stowed position at the front of the coat with the collar not folded back.

Turning also to FIGS. 2, 4, and 7, each of the layers 14, 16 include a first set of wings, with outer layer 16 including front wings 28, 30 and inner layer 14 having coextensive wings 32, 34 coupled to the proximal end 18 and extending forwardly of the first expanse 20 that secure together about the neck of the animal 12. When only the bottom insulative layer 12 is exposed as shown in FIG. 7, the wings 32, 34 are secured together about the neck of animal 12 via hook and loop fasteners 36, 38 disposed on opposing sides of wings 36, 38, respectively. When the top waterproof layer 16 is in an unfurled position as shown in FIG. 1, the front wings 28, 30 of layer 16 are also secured together overtop the inner layer wings 32, 34 as via releasable snaps 40, 42 disposed on the wings.

The bottom, insulative layer 14 of garment 10 also includes a second set of wings 44, 46 disposed midway down the first expanse 20 and distally to the first set 32, 34 and configured to secure together about the trunk of the animal 12 as via hook and loop fasteners 48, 50 disposed on opposing sides of wings 44, 46, respectively.

A plurality of separable fasteners are configured to attach the second waterproof expanse 16 to the first expanse 14. In the embodiment shown in the figures, these separable fasteners are implemented as snaps with complementary male/female pairs aligned adjacent peripheral edges 52, 54 of bottom and top layer expanses 20, 22. However, any type of releasable fasteners could be used without departing from the spirit of the invention, such as hook-and-loop fasteners, buttons, or magnets.

Top waterproof layer expanse 22 includes separable fasteners disposed about its peripheral edge 54 such as peripheral snaps 56a-56e and proximal snap 58, where proximal snap 58 is positioned adjacent the proximal edge 18 of the bottom insulative layer expanse 20 and disposed within the gap 26 created between the collar 24 and the first expanse 20 (see, e.g., FIG. 6). Waterproof expanse 22 is preferably formed of a polyester/polyurethane laminated dual-sided knit fabric with the top-facing side having a more fabric texture and appearance and the bottom-facing side having a smoother, waterproof texture. A bias trim is disposed along the peripheral edge 54 of waterproof layer 16, as by using a bias fabric tape sewn with a straight stitch on the edge of the polyurethane rain coat to the extent shown by the dashed line, to provide reinforcement to the peripheral edges 54 so that snaps 56a-56e may be retained therein. Other examples of a reinforcing bias trim include cotton/polyester fabric, flannel, denim, reflective tape, and twill tape.

The second expanse 22 is configured to be detached from all but the proximal one 58 of the plurality of fasteners and rolled up adjacent the proximal end 18 of the first expanse 20 so that an entirety of the second expanse 22 is retained within the gap 26 created between the collar 24 and the first expanse 20 in the stowed position of the second expanse 22. The proximal fastener 58 can thus be releasable as via a snap 59 (FIG. 6) or permanently attached adjacent the proximal end of the lower expanse 20 so that the waterproof layer 16 can never be detached from the lower insulative layer 14. Alternately, the fastener can be of a different type, such as a button that may be less likely to detach as the snaps 56a-56e.

Each of the separable fasteners on the top waterproof layer expanse 22, such as peripheral snaps 56a-56e, are aligned with and releasably attached to complementary snaps 60a-60e disposed about the peripheral edge 52 of the lower insulative layer expanse 20. In the unfurled position as shown in FIG. 1, each of the snaps 56a-56e are coupled to complementary snaps 60a-60e. FIGS. 1 and 2 show a corner of waterproof layer 16 detached and folded away from layer 14, but this is to expose layer 14 underneath for illustrative purposes only. The normal unfurled position is where snap 56d is also attached to snap 60d so that the waterproof layer 16 lays flat against and fully protects the insulative layer 14 beneath it in case of rainy weather.

To assist in securing the collar 24 to either the top waterproof layer 16 in the unfurled position shown in FIG. 1, or to bottom insulative layer 14 when layer 16 is in the stowed position as shown in FIG. 7, separable collar fasteners (such as snaps 62a-62c) are disposed adjacent a peripheral forward edge of the collar 24. The garment 10 further includes one or more separable complementary collar fastener (such as snap 64) exposed on the outside of waterproof expanse 22 and positioned distally from the proximal fastener position 58. Collar snap 62b would thus attach to complementary snap 64 at a fastened position so that the collar 24 may be folded back and attached to layer 16 and waterproof expanse 22 as shown in FIG. 1. In a preferred embodiment as shown, the fastened position of snaps 62b and 64 are disposed along a central axis 66 of the garment 10 and/or the first and second expanses 20, 22.

To assist in securing the collar 24 to the bottom insulative layer 14 when the top waterproof layer 16 is in the stowed position as shown in FIG. 7, the separable collar fasteners 62a-62c along the proximal, forward expanse of the collar 24 attach to complementary collar fasteners 68a-68c. That is, the plurality of separable fasteners 62a-62c disposed on a peripheral edge of the collar 24 are configured to attach to complementary fasteners 68a-68c disposed distally from the proximal edge 18 of the first expanse 20. This, then, couples a proximal expanse of the collar 24 to the first expanse 14 and thereby creates a closable pocket or gap 26 therebetween into which the waterproof layer 16 may be rolled up and stored in the stowed position as shown in FIGS. 6 and 7.

FIGS. 2-6 illustrate the process steps by which the top waterproof layer 16 is moved from the unfurled position shown in FIG. 2 to the stowed position shown in FIG. 6.

In FIG. 2, top layer 16 is shown attached along its top layer 16 peripheral edge 54 to the peripheral edge 52 of bottom layer 14 as via the releasable snaps 56a-56e engaged with complementary snaps 60a-60e. Top layer 16 thus runs coextensively with bottom layer 14 so that the top layer expanse 22 lays flat against the bottom layer expanse 20 and the pair of top layer wings 28, 30 align with the bottom layer proximal wings 32, 34.

Figure 3:
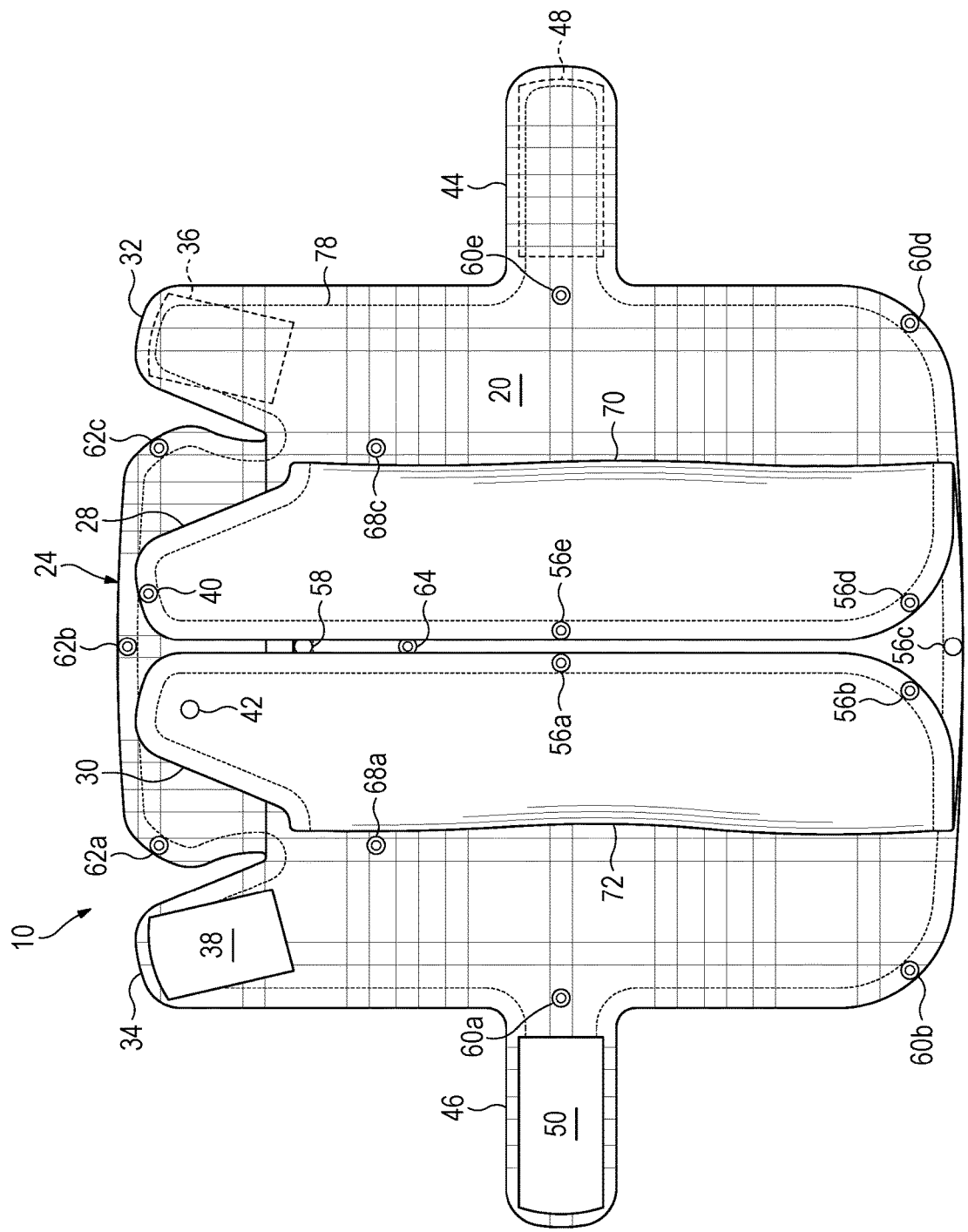
FIG. 3 is a plan view of the animal coat of FIG. 1 with the outer layer partially unfastened in a transition phase between the unfurled position of FIG. 2 and the concealed or stowed position of FIG. 4.

In FIG. 3, the releasable snaps 56a-56e of the top layer 16 are detached from complementary snaps 60a-60e on the bottom layer 14. The sides of top layer 16 are then folded inward on either side of the long axis 66 of the garment 10 so that the distance between the folded side edges 70, 72 is less than the width of collar 24.

In FIG. 4, the folded top layer 16 is then rolled upward to a position forwardly (e.g. closer to proximal edge 18) of complementary collar snaps 68a-68c. The proximal wings 28, 30 are then folded downward overtop the rolled top layer 16 to the position shown in FIG. 4.

Figure 5:
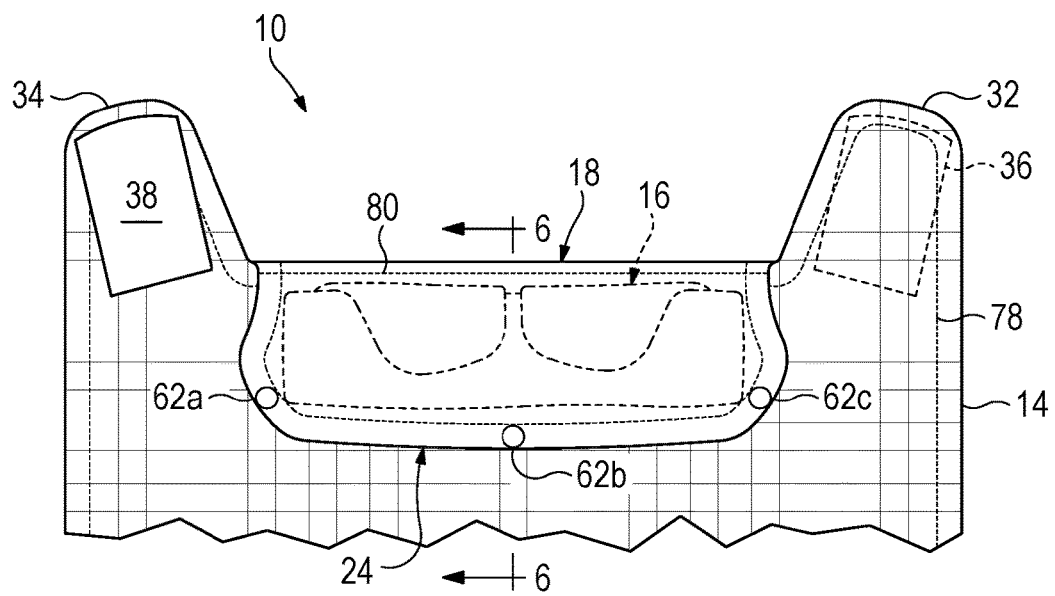
FIG. 5 is a partial plan view of the animal coat of FIG. 4 with the outer layer moved to a stowed position beneath a collar that has been folded back against the inner layer.

In FIG. 5, and with the rolled top layer 16 in a stowed position, the collar 24 is then folded downward overtop the rolled top layer 16 and releasably fastened to complementary fasteners 68a-68c on the top side of the bottom insulative layer 14 via collar snaps 62a-62c.

FIG. 6 illustrates a side section view of the garment 10 with the top waterproof layer 16 rolled up into the stowed position and disposed within a pocket or gap 26 formed when the collar 24 is folded over the stowed top layer 16 and attached as via releasable snap 62b to snap 68b. A top or proximal portion of the top layer 16 is still shown attached to the bottom layer 14 via snap 58 to proximal snap 59. This connection between top layer can be permanent as via a stitch or fabric adhesive to reduce the chance that the top layer can be separated and lost from the bottom layer. Alternately, and as shown, the coupling between the top and bottom layers 16, 14 at this proximal attachment location can be temporary and releasable as via snaps 58, 59 or via a button or hook-and-loop fastener (not shown) so that the top layer 16 may be detached and laundered separately from the bottom layer 14.

To add additional insulative properties to the bottom insulative layer 14 of the garment 10, layer 14 may be formed of two layers of fabric 74, 76 as shown in FIG. 6 and stitched together along a peripheral seam such as top stitch 78. Layers 74, 76 can both be made of the same materials, such as polar fleece, or from different fabrics such as a quilted fabric for top layer 74 and a Sherpa fabric for bottom layer 76. An additional seam 80 couples the two layers of fabric 74, 76 together adjacent the peripheral edge 18 of collar 24. In the embodiment shown, expanse 20 and collar 24 are made of a unitary construction formed of two layers 74, 76 top stitched together at top stitches 78, 80. In other embodiments, the collar 24 and insulative expanse 20 are two pieces that button or otherwise releasably attach to one another along the peripheral edge 18 of expanse 20. Furthermore, top stitch 78 can pass along the peripheral edge of collar 24 as shown in the drawings or, in the alternative, such layers 74, 76 of the collar would only be coupled together via an internal straight stitch that is not viewable from an exterior of the garment 10.

FIG. 7 provides a contrast with FIG. 1 in that the top waterproof layer 16 is now fully hidden from view in its stowed position beneath collar 24. The insulative layer 14 with decorative patterning (shown here with stippling and in FIGS. 2-6 with plaid patterning) is thus fully exposed. Should it start raining during a walk of the animal, the collar snaps 62a-62c may then be uncoupled from respective complementary snaps 68a-68c on the bottom layer 14, the collar 24 folded up, and the top waterproof layer 16 unfurled and snapped along its periphery to complementary snaps 60a-60e on the bottom layer 14. The top layer wings 28, 30 are then snapped together around the neck of the animal 12 overtop and coextensively with the bottom layer wings 32, 34. The collar 24 is then folded back against the top side of the top layer 16 and coupled to snap 64 in the configuration shown in FIG. 1.

In other aspects of the invention, the first expanse may be formed from material having an asymmetric resilient expansion greater along a lateral extent than along a long axis of the expanse. That is, the bottom layer 14 fabric may stretch more laterally than longitudinally so the animal wearing the garment 10 is able to breath normally and not be constricted by the worn garment as the animal's chest expands and contracts during a normal breathing cycle. Alternately, the bottom layer 14 may be formed of a 4-way stretch fleece that accommodates expansion both laterally as well as longitudinally.

In a specific embodiment, the invention comprises a fleece expanse of a general rectangular configuration with two sets of wings, each having hook-and-loop attachments at their end so that the wing sets can be wrapped around and attached together both in front of, and behind, the legs respectively to secure the expanse over the back of the dog. Attachment points, here button snaps, are arranged about the periphery of the rectangular expanse. A layer of a waterproof membrane is attached at one end of the expanse adjacent the neck of the dog and has two positions: (1) in a rolled-up configuration and covered by a front flap of the expanse that is folded back over the membrane, and (2) in a rolled-out position whereby the membrane is snapped to the button snaps so that it lays flat against the fleece expanse and forms a protective waterproof layer. In this way, a colorful fleece expanse is exposed to view during dry sunny days when the waterproof membrane is rolled up and hidden by the front flap, and the less attractive waterproof membrane exposed during rainy weather when rolled out and attached along the periphery of the fleece expanse.

Having described and illustrated the principles of the invention in a preferred embodiment thereof, it should be apparent that the invention can be modified in arrangement and detail without departing from such principles. For instance, coaxial openings can be formed along the central axis 66 of layers 14, 16 that admit a harness ring therethrough in case the animal 12 is fitted with a harness and not a collar. The waterproof layer 16 opening can be lined with a resilient and waterproof elastic material that compresses about the opening to minimize leakage when the ring is received therethrough and thus retain the waterproof character of the layer 16. Accordingly, I claim all modifications and variation coming within the spirit and scope of the following claims.

What is claimed is:

1. A garment for a four legged animal, comprising:
   a first insulative expanse configured to substantially cover the trunk of an animal, with said first expanse having a proximal end adjacent the neck of the animal;
   a second waterproof expanse configured to attach to and substantially cover said first expanse in a first unfurled position and to roll up adjacent the proximal end of the first expanse in a second stowed position;
   a collar extending forwardly from the proximal end of the first expanse and configured to be folded back to create a gap with the first expanse in which at least a portion of the second expanse is disposed; and
   a plurality of separable fasteners configured to attach said second expanse to said first expanse, wherein at least a proximal one of the plurality of fasteners attaching the second expanse to the first expanse is disposed within the gap created between the collar and the first expanse,
   wherein the second expanse is configured to be detached from all but the proximal one of the plurality of fasteners and rolled up adjacent the proximal end of the first expanse so that an entirety of the second expanse is retained within the gap created between the collar and the first expanse in the second stowed position of the second expanse.

2. The garment of claim 1, further including a separable collar fastener configured to attach said collar with said first expanse.

3. The garment of claim 2, wherein the proximal one of the plurality of fasteners attaching the second expanse to the first expanse is disposed along a central axis of the first expanse closer to the proximal edge of the first expanse than the separable collar fastener.

4. The garment of claim 1, wherein the first expanse includes a first set of proximal wings attachable together around the neck of the animal and a second set of distal wings attachable together around the trunk of the animal to retain the garment on the animal.

5. The garment of claim 1, wherein at least a portion of said separable fasteners configured to attach said second expanse to said first expanse are disposed adjacent a peripheral edge of both the first and second expanses.

6. The garment of claim 5, further including a separable fastener on a peripheral edge of the collar configured to attached to a complementary fastener disposed distally from the proximal edge of the first expanse.

7. The garment of claim 5, further including a plurality of separable fasteners on a peripheral edge of the collar configured to attached to complementary fasteners disposed distally from the proximal edge of the first expanse.

8. The garment of claim 1, wherein the first expanse is formed from material having an asymmetric resilient expansion greater along a lateral extent than along a long axis of the first expanse.

9. A garment for a four legged animal, comprising:
   a first expanse configured to substantially cover the trunk of an animal, with said first expanse having a proximal end adjacent the neck of the animal;
   a first set of wings coupled to the proximal end of the first expanse and configured to secure together about the neck of the animal;
   a second set of wings coupled to the first expanse distally to the first set and configured to secure together about the trunk of the animal;
   a collar extending forwardly from the proximal end of the first expanse and configured to be folded back to create a gap with the first expanse; and
   a second expanse configured to attach to and substantially cover said first expanse in a first unfurled position and to roll up adjacent the proximal end of the first expanse in a second stowed position within the gap formed between the collar and the first expanse.

10. The garment of claim 9, further including a plurality of separable fasteners disposed about a peripheral edge of the first expanse and configured to attach said second expanse to said first expanse.

11. The garment of claim 10, wherein the second expanse is coupled to the first expanse at a fastened position within the gap formed between the collar and the first expanse.

12. The garment of claim 11, wherein the second expanse is coupled to the first expanse at the fastened position via a separable fastener.

13. The garment of claim 11, further including a separable collar fastener positioned distally from said fastened position and configured to attach said collar with said first expanse.

14. The garment of claim 13, wherein the fastened position and separable collar fastener are disposed along a central axis of the first expanse.

15. The garment of claim 11, further including a plurality of separable collar fasteners positioned distally from said fastened position and configured to attach a proximal expanse of the collar to the first expanse and thereby create a closable pocket therebetween.

16. The garment of claim 11, wherein the separable fasteners are snap-type fasteners.

17. The garment of claim 9, wherein the first and second set of wings are coupled together using hook-and-loop-type fasteners disposed on opposing sides of the wings.

18. The garment of claim 9, wherein the first expanse is formed from material having an asymmetric resilient expansion greater along a lateral extent than along a long axis of the expanse.

19. The garment of claim 9, wherein the first expanse is formed from a material having a symmetric resilient expansion that is the same along a lateral extent as along a long axis of the expanse.

20. The garment of claim 9, wherein an entirety of the second expanse is retained within the gap created between the collar and the first expanse in the second stowed position of the second expanse.

* * * * *